United States Patent
Xu et al.

(10) Patent No.: US 12,486,761 B1
(45) Date of Patent: Dec. 2, 2025

(54) METHOD FOR QUANTITATIVE EVALUATION OF GAS SEAL PERFORMANCE OF ANNULAR BLOWOUT PREVENTER

(71) Applicant: Chongqing University of Science and Technology, Chongqing (CN)

(72) Inventors: Honglin Xu, Chongqing (CN); Xing Yang, Chongqing (CN); Hongfu Mi, Chongqing (CN); Shilin Xiang, Chongqing (CN); Nian Peng, Chongqing (CN); Yufei Li, Chongqing (CN); Shiguo Tang, Chongqing (CN); Geng Tang, Chongqing (CN); Xueyuan Long, Chongqing (CN); Bin Yang, Chongqing (CN)

(73) Assignee: Chongqing University of Science and Technology, Chongqing (CN)

( * ) Notice: Subject to any disclaimer, the term of this patent is extended or adjusted under 35 U.S.C. 154(b) by 0 days.

(21) Appl. No.: 19/182,651

(22) Filed: Apr. 18, 2025

(30) Foreign Application Priority Data

Aug. 12, 2024 (CN) .......................... 202411097197.5

(51) Int. Cl.
*E21B 47/117* (2012.01)
*E21B 33/06* (2006.01)
*E21B 21/08* (2006.01)
*G01M 3/28* (2006.01)

(52) U.S. Cl.
CPC ............ *E21B 47/117* (2020.05); *E21B 33/06* (2013.01); *E21B 21/08* (2013.01); *E21B 2200/20* (2020.05); *G01M 3/2853* (2013.01)

(58) Field of Classification Search
USPC .............................................. 702/2
See application file for complete search history.

(56) References Cited

U.S. PATENT DOCUMENTS

| | | | |
|---|---|---|---|
| 4,090,395 A * | 5/1978 | Dixon | E21B 33/04 73/40.5 R |
| 2016/0290889 A1* | 10/2016 | Hilpert | E21B 33/06 |
| 2017/0130562 A1* | 5/2017 | Jaffrey | E21B 47/001 |
| 2017/0130575 A1* | 5/2017 | Jaffrey | G01L 1/22 |
| 2020/0300052 A1* | 9/2020 | Johnson | E21B 47/06 |

* cited by examiner

*Primary Examiner* — Paul D Lee
(74) *Attorney, Agent, or Firm* — Addison D. Ault; IPGentleman Intellectual Property Services, LLC

(57) ABSTRACT

A method for quantitative evaluation of gas seal performance of an annular blowout preventer is provided. The equivalent average contact pressure of the tubing-rubber core sealing surface is acquired based on the principle of equivalent seal contact energy, the tubing-rubber core microscopic contact state is simulated by using elastic-plastic normal flattening contact between the rigid smooth flat plate and the uniformly distributed spherical micro-convex body rough plate, the actual contact area of the single spherical micro-convex body under the equivalent average contact pressure of tubing-rubber core sealing surface is acquired, and then the circumferential width and average height of the microscopic leakage channel at the tubing-rubber core contact interface are acquired, the gas leakage volume rate of gas through the tubing-rubber core interface is acquired by using the parallel plate model in hydrodynamics, and the gas leakage volume rate is compared to the allowable gas leakage volume rate.

2 Claims, 2 Drawing Sheets

METHOD FOR QUANTITATIVE EVALUATION OF GAS SEAL PERFORMANCE OF ANNULAR BLOWOUT PREVENTER

CROSS-REFERENCE TO THE RELATED APPLICATIONS

This application is based upon and claims priority to Chinese Patent Application No. 202411097197.5, filed on Aug. 12, 2024, the entire contents of which are incorporated herein by reference.

TECHNICAL FIELD

The present invention relates to the field of oil and gas well safety technology, particularly a method for quantitative evaluation of gas seal performance of an annular blowout preventer.

BACKGROUND

The snubbing operation in a gas well is to complete the drilling, fracturing and acidizing, and workover construction by tripping the tubing or drill pipe under the condition of wellhead pressure, which has a significant effect on unconventional reservoir protection and increasing reserves and raising yield. The annular blowout preventer is the key core device for the safety and success of snubbing operation in gas wells, wherein the annular blowout preventer realizes the dynamic sealing of tubing-casing annulus by forming tubing-rubber core contact pair through piston upward extrusion rubber core and tubing. The sealing failure of the annular blowout preventer can easily induce the leakage of wellhead natural gas, which poses a serious threat to the safety and environmental risk of snubbing operations in gas wells. Therefore, it is essential to quantitatively and reliably evaluate the safety of the gas seal of the annular blowout preventer for the safety control of snubbing operations in gas wells.

The existing evaluation methods for the gas seal performance of annular blowout preventers mainly include the theoretical method, finite element method and experimental method. The theoretical method and finite element method are used primarily to obtain the macroscopic contact pressure distribution of the sealing surface by establishing the macroscopic contact mechanical model of the tubing-rubber core contact pair, and then to judge whether the blowout preventer meets the sealing requirements simply by using whether the contact pressure exceeds the wellhead annulus pressure value, or to judge whether the blowout preventer meets the gas sealing requirements by comparing the seal index of the product of contact pressure and contact length with the critical seal index based on the seal contact energy theory. Actually, the leakage of the annular blowout preventer is essentially a flow problem of gas through the microscopic gaps of the tubing-rubber core contact pair due to the surface roughness of the tubing-rubber core contact pair. However, the existing methods for evaluating the gas seal performance of annular blowout preventer based on the macroscopic contact pressure of sealing surface cannot consider the effect of the microscopic contact state of tubing-rubber core contact pair on the gas leakage channel, so it cannot directly evaluate the gas leakage rate and sealing safety of tubing-rubber core contact pair of annular blowout preventer under the snubbing operation in gas well quantitatively and reliably. Although the experimental method can simulate and test the dynamic leakage rate of tubing-rubber core contact pair by establishing the physical model of full-size or small-size blowout preventer seal structure, this method is costly, time-consuming and laborious, and has some safety risks, and only a few verification experiments are generally carried out. Therefore, it is difficult to evaluate the gas seal performance of the annular blowout preventer economically and rapidly.

SUMMARY

An objective of the present invention is to provide a method for quantitative evaluation of gas seal performance of an annular blowout preventer, which solves the problem that the existing method is difficult to quantitatively evaluate the sealing safety of the annular blowout preventer rapidly and economically, and has high reliability.

In order to achieve the above objective, the present invention provides a method for quantitative evaluation of gas seal performance of an annular blowout preventer, the method includes the following steps:

S1, acquiring an equivalent average contact pressure $p_{cm}$ of a tubing-rubber core sealing surface;

S2, acquiring a contact area $A_c$ of a single spherical micro-convex body on the tubing-rubber core sealing surface under the equivalent average contact pressure;

S3, acquiring a circumferential width B of a microscopic leakage channel at a tubing-rubber core contact interface;

S4, acquiring an average height H of the microscopic leakage channel at the tubing-rubber core contact interface;

S5, acquiring a leakage volume rate $Q_v$ of the tubing-rubber core contact interface of the annular blowout preventer during a snubbing operation in a gas well; and S6, comparing the leakage volume rate $Q_v$ to an allowable leakage volume rate $Q_a$, if $Q_v \geq Q_a$ is satisfied, then the seal of the annular blowout preventer fails, otherwise it is safe.

Wherein in step S1, a calculation formula for acquiring the equivalent average contact pressure of the tubing-rubber core sealing surface is:

$$p_{cm} = \left[\frac{1}{L_c}\int_0^{L_c} p_c(l)^a\right]^{1/a}$$

in the calculation formula: $p_{cm}$ is the equivalent average contact pressure of the tubing-rubber core sealing surface, in the unit of MPa; $L_c$ is an axial contact length of tubing-rubber core sealing surface, in the unit of mm; $p_c(l)$ is a contact pressure distribution of tubing-rubber core sealing surface, in the unit of MPa; a is a seal contact energy index, and is dimensionless.

Wherein step S2 further includes: the tubing-rubber core contact pair is regarded as an elastic-plastic normal flattening contact between a rigid smooth plate and a uniformly distributed spherical micro-convex body rough plate, and the contact area $A_c$ of the single spherical micro-convex body under the equivalent average contact pressure $p_{cm}$ is obtained by a finite element software simulation.

Wherein in step S3, a calculation formula for acquiring the circumferential width of the microscopic leakage channel at the tubing-rubber core contact interface is:

$$B = \frac{1000\pi D_o}{R_a}\left(R_a - \sqrt{\frac{A_c}{\pi}}\right)$$

in the calculation formula: B is the circumferential width of the microscopic leakage channel at the tubing-rubber core contact interface, in the unit of μm; $D_o$ is an outer diameter of the tubing, in the unit of mm; $R_a$ is a circumferential roughness of the rubber core surface, in the unit of μm; $A_c$ is the contact area of the single spherical micro-convex body, in the unit of μm².

Wherein in step S4, a calculation formula for acquiring an average height of the microscopic leakage channel at the tubing-rubber core contact interface is:

$$H = \frac{\left(2R_a - \sqrt{\frac{A_c}{\pi}}\right)\sqrt{R_a^2 - \frac{A_c}{\pi}} + \left(\arcsin\frac{1}{R_a}\sqrt{\frac{A_c}{\pi}} - \frac{\pi}{2}\right)R_a^2}{2\left(R_a - \sqrt{\frac{A_c}{\pi}}\right)}$$

in the calculation formula: H is the average height of the microscopic leakage channel at the tubing-rubber core contact interface, in the unit of μm.

Wherein in step S5, a calculation formula for acquiring the leakage volume rate of the tubing-rubber core contact interface is:

$$Q_v = \frac{10^{-15}BH^3(p_{whg} - P_{atm})}{12L_c\eta}$$

in the calculation formula: $Q_v$ is the gas leakage volume rate of the tubing-rubber core contact interface, in the unit of cm³/s; $p_{whg}$ is a maximum allowable pressure value of wellhead tubing-casing annulus, in the unit of MPa; $p_{atm}$ is atmospheric pressure, in the unit of MPa; η is a dynamic viscosity of wellhead pressurized gas, in the unit of MPa·s.

A method for quantitative evaluation of gas seal performance of annular blowout preventer of the present invention, the equivalent average contact pressure of the tubing-rubber core sealing surface is acquired based on the principle of equivalent seal contact energy, the tubing-rubber core microscopic contact state is simulated by using elastic-plastic normal flattening contact between the rigid smooth flat plate and the uniformly distributed spherical micro-convex body rough plate, and the actual contact area of the single spherical micro-convex body under the equivalent average contact pressure of tubing-rubber core sealing surface is acquired, and then the circumferential width and average height of the microscopic leakage channel at the tubing-rubber core contact interface are acquired, the gas leakage volume rate of gas through the tubing-rubber core interface is acquired by using the parallel plate model in hydrodynamics, and the gas leakage volume rate is compared to the allowable gas leakage volume rate, the sealing safety of the annular blowout preventer is quantitatively evaluated rapidly and economically, and has high reliability.

BRIEF DESCRIPTION OF THE DRAWINGS

In order to more clearly illustrate the technical solutions in the embodiments or existing technology of the present application, the following is a brief description of the accompanying drawings that need to be used in the description of the embodiments or existing technology.

DETAILED DESCRIPTION OF THE EMBODIMENTS

Embodiments of the present invention are described in detail below, examples of the embodiments are shown in the accompanying drawings, and the embodiments described below by reference to the accompanying drawings are exemplary and are intended to be used in the explanation of the present invention and are not to be construed as a limitation of the present invention.

Figure 1:
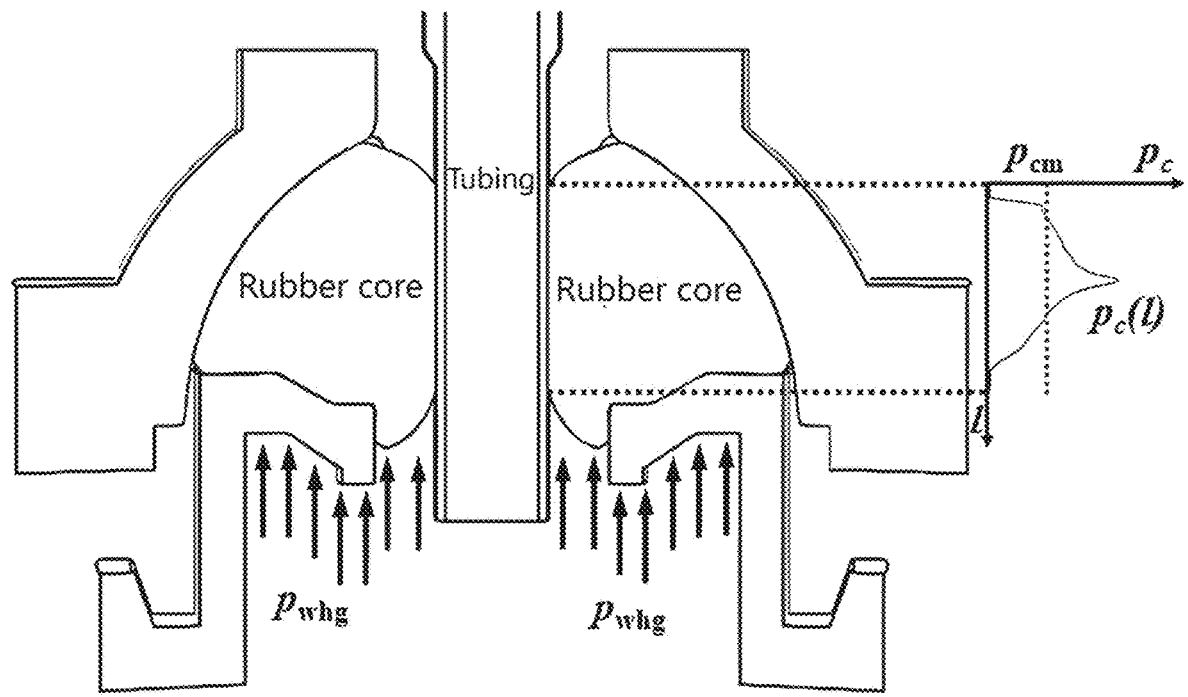
FIG. 1 is a schematic diagram of a tubing-rubber core sealing surface of an annular blowout preventer of the present invention.
Figure 2:
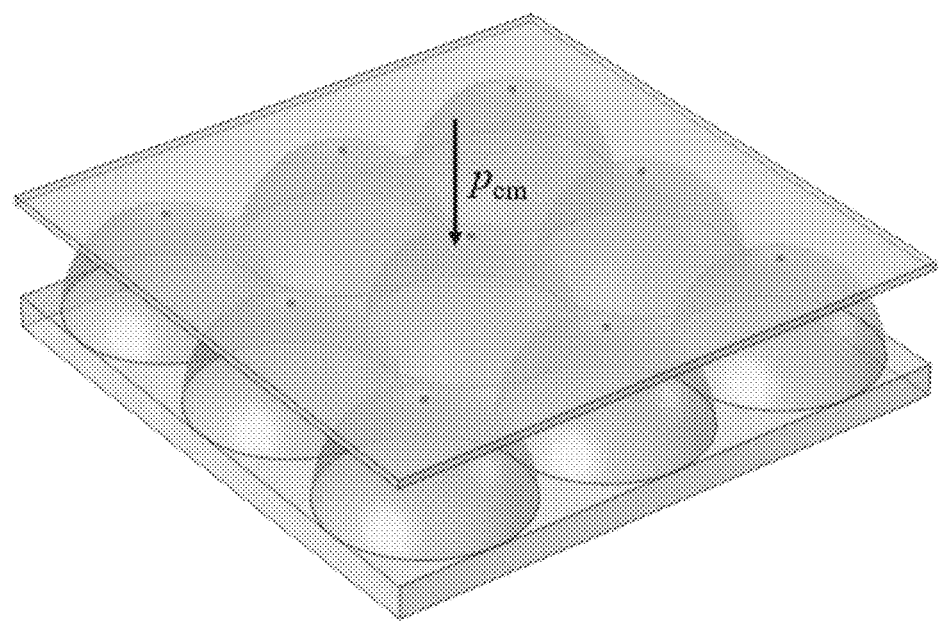
FIG. 2 is a diagram of an elastic-plastic normal flattening contact simulation of a tubing-rubber core contact pair of the present invention.
Figure 3:
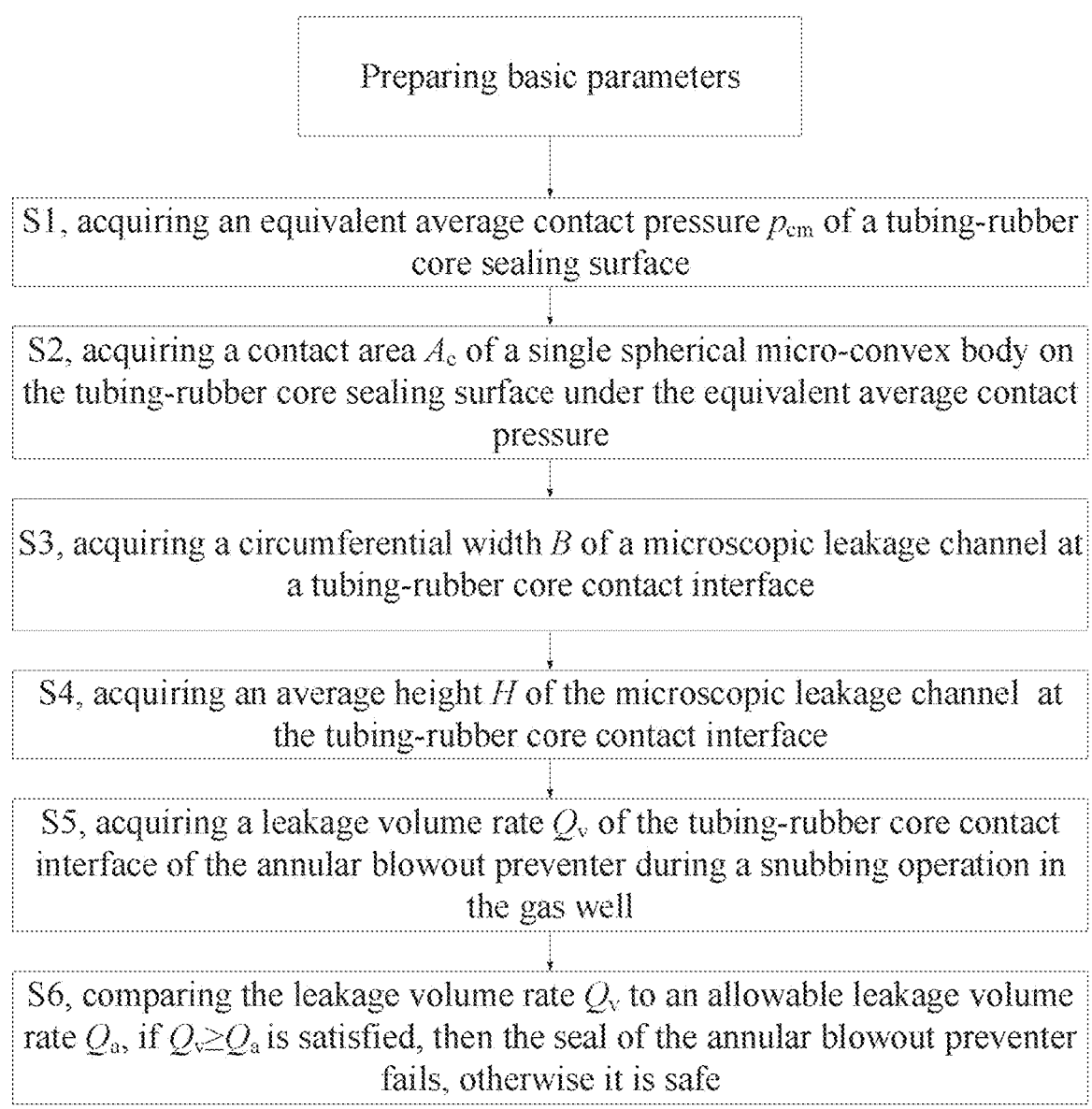
FIG. 3 is a flow chart of a quantitative evaluation of a gas sealing performance of an annular blowout preventer of the present invention.

With reference to FIGS. 1-3, wherein FIG. 1 is the schematic diagram of the tubing-rubber core sealing surface of the annular blowout preventer. FIG. 2 is the diagram of the elastic-plastic normal flattening contact simulation of the tubing-rubber core contact pair. FIG. 3 is the flow chart of the quantitative evaluation of the gas sealing performance of the annular blowout preventer. The present invention provides the method for quantitative evaluation of gas seal performance of the annular blowout preventer, the method includes the following steps:

S1, the equivalent average contact pressure $p_{cm}$ of the tubing-rubber core sealing surface is acquired;

specifically, $p_c(l)$, $L_c$, and a are acquired, and the formula is adopted based on the principle of equivalent sealing contact energy:

$$p_{cm} = \left[\frac{1}{L_c}\int_0^{L_c} p_c(l)^a\right]^{1/a}$$

the equivalent average contact pressure $p_{cm}$ of the tubing-rubber core sealing surface is calculated and acquired;

where $p_{cm}$ is the equivalent average contact pressure of the tubing-rubber core sealing surface, in the unit of MPa; $L_c$ is the axial contact length of tubing-rubber core sealing surface, in the unit of mm; $p_c(l)$ is the contact pressure distribution of tubing-rubber core sealing surface, in the unit of MPa; a is the seal contact energy index, and is dimensionless.

S2, the contact area $A_c$ of the single spherical micro-convex body on the tubing-rubber core sealing surface under the equivalent average contact pressure is acquired;

specifically, as shown in FIG. 2, the tubing-rubber core contact pair is regarded as the elastic-plastic normal flattening contact between the rigid smooth plate and the uniformly distributed spherical micro-convex body rough plate, and the contact area $A_c$ of the single spherical micro-convex body under the equivalent average contact pressure $p_{cm}$ is acquired by the finite element software simulation.

S3, the circumferential width B of the microscopic leakage channel at the tubing-rubber core contact interface is acquired;

specifically, $D_o$, and $R_a$ are acquired, and the formula is adopted:

$$B = \frac{1000\pi D_o}{R_a}\left(R_a - \sqrt{\frac{A_c}{\pi}}\right)$$

the circumferential width B of the microscopic leakage channel at the tubing-rubber core contact interface is calculated and acquired.
where B is the circumferential width of the microscopic leakage channel at the tubing-rubber core contact interface, in the unit of μm; $D_o$ is the outer diameter of the tubing, in the unit of mm; $R_a$ is the circumferential roughness of the rubber core surface, in the unit of μm; $A_c$ is the contact area of the single spherical micro-convex body, in the unit of μm².
S4, the average height H of the microscopic leakage channel at the tubing-rubber core contact interface is acquired;
specifically, the formula is adopted:

$$H = \frac{\left(2R_a - \sqrt{\frac{A_c}{\pi}}\right)\sqrt{R_a^2 - \frac{A_c}{\pi}} + \left(\arcsin\frac{1}{R_a}\sqrt{\frac{A_c}{\pi}} - \frac{\pi}{2}\right)R_a^2}{2\left(R_a - \sqrt{\frac{A_c}{\pi}}\right)}$$

the average height H of the microscopic leakage channel at the tubing-rubber core contact interface is calculated and acquired.
where H is the average height of the microscopic leakage channel at the tubing-rubber core contact interface, in the unit of μm.
S5, the leakage volume rate $Q_v$ of the tubing-rubber core contact interface of the annular blowout preventer during the snubbing operation in the gas well is acquired;
specifically, $p_{whg}$, $p_{atm}$, and η are acquired, and the formula is adopted:

$$Q_v = \frac{10^{-15}BH^3(p_{whg} - p_{atm})}{12L_c\eta}$$

the leakage volume rate $Q_v$ of the tubing-rubber core contact interface of the annular blowout preventer during the snubbing operation in the gas well is calculated and acquired;
where $Q_v$ is the gas leakage volume rate of the tubing-rubber core contact interface, in the unit of cm³/s; $p_{whg}$ is the maximum allowable pressure value of wellhead tubing-casing annulus, in the unit of MPa; $p_{atm}$ is the atmospheric pressure, in the unit of MPa; η is the dynamic viscosity of wellhead pressurized gas, in the unit of MPa·s.
S6, $Q_a$ is acquired, the gas leakage volume rate $Q_v$ in step S5 is compared to the allowable leakage volume rate $Q_a$, if $Q_v \geq Q_a$ is satisfied, then the seal of the annular blowout preventer fails, otherwise, it is safe.
In the above steps, $p_c(l)$ and $L_c$ can be obtained by numerical simulation or ultrasonic online test; $D_o$ can be obtained by consulting the tubing parameters; $R_a$ can be obtained by consulting the rubber core product parameters or experiments; $p_{whg}$ and $p_{atm}$ can be obtained by consulting the engineering data of snubbing operation; a can be obtained by sealing experiments; η can be obtained by experimental or field operating parameters; $Q_a$ is determined by relevant standards or the actual requirements of safety management and control of snubbing operation.

Embodiment 1

As shown in FIG. 1, the contact pressure distribution $p_c(l)$ of the tubing-rubber core sealing surface is obtained by numerical simulation, and the axial contact length $L_c$ of the tubing-rubber core sealing surface is 109.51 mm; the outer diameter $D_o$ of the tubing is 88.9 mm by consulting the tubing parameters; the circumferential roughness of the rubber core surface $R_a$ of 1.2 μm is obtained by consulting the rubber core product parameters or experiments; the maximum allowable pressure value of wellhead tubing-casing annulus $p_{whg}$ of 35 MPa and the atmospheric pressure $p_{atm}$ of 0.101325 MPa are obtained by consulting the engineering data of snubbing operation; the seal contact energy index a of 1.4 is obtained by sealing experiment; the dynamic viscosity of wellhead pressurized gas η of 3.2×10⁻¹¹ MPa·s is obtained by field operating parameters; the allowable leakage volume rate $Q_a$ is taken as 0.9 cm³/15 min by consulting the relevant industry standards.
Step 1: based on the principle of equivalent seal contact energy, the equivalent average contact pressure $p_{cm}$ of tubing-rubber core sealing surface is calculated and obtained to be 45.84 MPa by adopting the formula $$p_{cm} = \left[\frac{1}{L_c}\int_0^{L_c} p_c(l)^a\right]^{1/a}.$$

Step 2: the tubing-rubber core contact pair is regarded as the elastic-plastic normal flattening contact between the rigid smooth plate and the uniformly distributed spherical micro-convex body rough plate, and the contact area $A_c$ of the single spherical micro-convex body under the equivalent average contact pressure $p_{cm}$ is acquired to be 3.167 μm² by the finite element software simulation.
Step 3: the circumferential width B of the microscopic leakage channel at the tubing-rubber core contact interface is calculated to be 45.619 mm by adopting the formula $$B = \frac{1000\pi D_o}{R_a}\left(R_a - \sqrt{\frac{A_c}{\pi}}\right).$$

Step 4: the average height H of the microscopic leakage channel at the tubing-rubber core contact interface is calculated to be 0.211 μm by adopting the formula $$H = \frac{\left(2R_a - \sqrt{\frac{A_c}{\pi}}\right)\sqrt{R_a^2 - \frac{A_c}{\pi}} + \left(\arcsin\frac{1}{R_a}\sqrt{\frac{A_c}{\pi}} - \frac{\pi}{2}\right)R_a^2}{2\left(R_a - \sqrt{\frac{A_c}{\pi}}\right)}.$$

Step 5: the leakage volume rate $Q_v$ of the tubing-rubber core contact interface of the annular blowout preventer during the snubbing operation in the gas well is calculated and acquired to be 0.0092 cm³/15 min by adopting the formula $$Q_v = \frac{10^{-15} BH^3 (p_{whg} - p_{atm})}{12 L_c \eta}.$$

Step 6: the gas leakage volume rate $Q_v$ is compared to the allowable leakage volume rate $Q_a$ to satisfy $Q_v < Q_a$, and the safety of the annular blowout preventer seal is determined.

In the embodiment, the equivalent average contact pressure of the tubing-rubber core sealing surface is acquired based on the principle of equivalent seal contact energy, the tubing-rubber core microscopic contact state is simulated by using elastic-plastic normal flattening contact between the rigid smooth flat plate and the uniformly distributed spherical micro-convex body rough plate, and the actual contact area of the single spherical micro-convex body under the equivalent average contact pressure of tubing-rubber core sealing surface is acquired, and then the circumferential width and average height of the microscopic leakage channel at the tubing-rubber core contact interface are acquired, the gas leakage volume rate of gas through the tubing-rubber core interface is acquired by using the parallel plate model in hydrodynamics, and the gas leakage volume rate is compared to the allowable gas leakage volume rate. Compared with the existing methods based on the macroscopic contact pressure of the sealing surface and the experimental method to evaluate the gas seal performance of the annular blowout preventer, this method can consider the effect of microscopic contact state of tubing-rubber core contact pair on gas leakage channel, and can rapidly and quantitatively evaluate the gas leakage rate and seal safety of the tubing-rubber core contact pair of the annular blowout preventer under snubbing operation in gas well, and have high reliability.

The above disclosure is only one or more of the better embodiments of this application, which cannot be used to limit the scope of the rights of this application, the general technical personnel in the field can understand the realization of the above embodiments of all or part of the process, and in accordance with the requirements of this application for equivalent changes, still belong to the scope of the application covered by this application.

What is claimed is:

1. A method for quantitative evaluation of gas seal performance of an annular blowout preventer, comprising the following steps:
   S1, acquiring an equivalent average contact pressure $p_{cm}$ of a tubing-rubber core sealing surface;
   S2, acquiring a contact area $A_c$ of a single spherical micro-convex body on the tubing-rubber core sealing surface under the equivalent average contact pressure;
   S3, acquiring a circumferential width B of a microscopic leakage channel at a tubing-rubber core contact interface;
   S4, acquiring an average height H of the microscopic leakage channel at the tubing-rubber core contact interface;
   S5, acquiring a leakage volume rate $Q_v$ of the tubing-rubber core contact interface of the annular blowout preventer during a snubbing operation in a gas well; and S6, comparing the leakage volume rate $Q_v$ to an allowable leakage volume rate $Q_a$, and when $Q_v \geq Q_a$ is satisfied, a seal of the annular blowout preventer is failing, and preventing a snubbing operation in a gas well from being performed; when $Q_v < Q_a$, the seal of the annular blowout preventer is safe, and performing the snubbing operation in the gas well;

in step S1, a calculation formula for acquiring the equivalent average contact pressure of the tubing-rubber core sealing surface is:

$$p_{cm} = \left[ \frac{1}{L_c} \int_0^{L_c} p_c(l)^a \right]^{1/a}$$

in the calculation formula: $p_{cm}$ is the equivalent average contact pressure of the tubing-rubber core sealing surface, in unit of MPa; $L_c$ is an axial contact length of the tubing-rubber core sealing surface, in unit of mm; $p_c(l)$ is a contact pressure distribution of the tubing-rubber core sealing surface, in the unit of MPa; a is a seal contact energy index, and is dimensionless;

wherein $L_c$ and $p_c(l)$ are obtained by numerical simulation or an ultrasonic online test, and a is obtained by sealing experiments;

in step S3, a calculation formula for acquiring the circumferential width of the microscopic leakage channel at the tubing-rubber core contact interface is:

$$B = \frac{1000 \pi D_o}{R_a} \left( R_a - \sqrt{\frac{A_c}{\pi}} \right)$$

in the calculation formula: B is the circumferential width of the microscopic leakage channel at the tubing-rubber core contact interface, in unit of μm; $D_o$ is an outer diameter of tubing, in the unit of mm; $R_a$ is a circumferential roughness of a rubber core surface, in the unit of μm; $A_c$ is the contact area of the single spherical micro-convex body, in unit of μm²; wherein $D_o$ is obtained by consulting tubing parameters, and $R_a$ is obtained by consulting rubber core product parameters or experiments;

in step S4, a calculation formula for acquiring the average height of the microscopic leakage channel at the tubing-rubber core contact interface is:

$$H = \frac{\left( 2R_a - \sqrt{\frac{A_c}{\pi}} \right) \sqrt{R_a^2 - \frac{A_c}{\pi}} + \left( \arcsin \frac{1}{R_a} \sqrt{\frac{A_c}{\pi}} - \frac{\pi}{2} \right) R_a^2}{2 \left( R_a - \sqrt{\frac{A_c}{\pi}} \right)}$$

in the calculation formula: H is the average height of the microscopic leakage channel at the tubing-rubber core contact interface, in the unit of μm;

in step S5, a calculation formula for acquiring the leakage volume rate of the tubing-rubber core contact interface is:

$$Q_v = \frac{10^{-15} BH^3 (p_{whg} - p_{atm})}{12 L_c \eta}$$

in the calculation formula: $Q_v$ is the leakage volume rate of the tubing-rubber core contact interface, in unit of cm³/s; $p_{whg}$ is a maximum allowable pressure value of a wellhead tubing-casing annulus, in the unit of MPa; $p_{atm}$ is atmospheric pressure, in the unit of MPa; $\eta$ is a dynamic viscosity of a wellhead pressurized gas, in unit of MPa·s; wherein $p_{whg}$ and $p_{atm}$ are obtained by consulting engineering data of the snubbing operation, $\eta$ is obtained by experimental or field operating parameters, and $Q_a$ is determined by relevant standards or actual requirements of safety management and control of the snubbing operation.

2. The method for the quantitative evaluation of the gas seal performance of the annular blowout preventer according to claim 1, wherein step S2 further comprises: regarding a tubing-rubber core contact pair as an elastic-plastic normal flattening contact between a rigid smooth plate and a uniformly distributed spherical micro-convex body rough plate, and obtaining the contact area $A_c$ of the single spherical micro-convex body under the equivalent average contact pressure $p_{cm}$ by a finite element software simulation.

\* \* \* \* \*